US010063539B2

(12) United States Patent
Hinton et al.

(10) Patent No.: US 10,063,539 B2
(45) Date of Patent: *Aug. 28, 2018

(54) SSO FUNCTIONALITY BY MEANS OF A TEMPORARY PASSWORD AND OUT-OF-BAND COMMUNICATIONS

(71) Applicant: International Business Machines Corporation, Armonk, NY (US)

(72) Inventors: Heather M. Hinton, Austin, TX (US); Kelly Malone, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/685,794

(22) Filed: Aug. 24, 2017

(65) Prior Publication Data
US 2017/0353447 A1    Dec. 7, 2017

Related U.S. Application Data

(63) Continuation of application No. 14/950,262, filed on Nov. 24, 2015, now Pat. No. 9,807,087.

(51) Int. Cl.
*H04L 29/06* (2006.01)
*G06N 7/00* (2006.01)

(52) U.S. Cl.
CPC ...... *H04L 63/0846* (2013.01); *H04L 63/0815* (2013.01); *H04L 63/10* (2013.01)

(58) Field of Classification Search
CPC .. H04L 63/10; H04L 63/0815; H04L 63/0846
See application file for complete search history.

(56) References Cited

U.S. PATENT DOCUMENTS 7,631,346 B2   12/2009   Hinton et al.
8,042,162 B2   10/2011   Blakley, III et al.
(Continued)

OTHER PUBLICATIONS

Tiwari et al., Single Sign-on with One Time Password, 978-1-4244-4570-7/09, copyright 2009 IEEE, 4 pages.
(Continued)

*Primary Examiner* — Joseph P Hirl
*Assistant Examiner* — Thomas Gyorfi
(74) *Attorney, Agent, or Firm* — Schmeiser, Olsen & Watts, LLP; William Hartwell

(57) ABSTRACT

A system and method for using a single-use password to add SSO functionality to a service of a Service Provider belonging to an F-SSO federation that does not support F-SSO functionality for the service. In response to receiving notification from an Identity Provider that a user has requested access to the service, the Service Provider uses information provided by the Identity Provider to identify and authenticate the user, and then uses standard API calls to create and send a temporary password to the user. This password may be created as a function of the user's physical location or IP address and may be communicated out-of-band. Upon determining that the user has correctly returned the temporary password to the Service Provider, the Service Provider generates and sends the user a strong single-use password through a secure in-band communication, through which the user may access the service.

20 Claims, 6 Drawing Sheets

(56) References Cited

U.S. PATENT DOCUMENTS

| | | |
|---|---|---|
| 8,365,267 B2 | 1/2013 | Wang et al. |
| 8,555,078 B2 | 10/2013 | Pravetz et al. |
| 8,607,322 B2 | 12/2013 | Hinton et al. |
| 8,838,792 B2 | 9/2014 | McCarty |
| 9,038,015 B1 | 5/2015 | Allsbrook |
| 9,197,638 B1 | 11/2015 | Livesay et al. |
| 2004/0181696 A1 | 9/2004 | Walker |
| 2005/0138381 A1 | 6/2005 | Stickle et al. |
| 2007/0006291 A1 | 1/2007 | Barari et al. |
| 2012/0011578 A1 | 1/2012 | Hinton et al. |
| 2012/0278872 A1 | 11/2012 | Woelfel et al. |
| 2014/0331273 A1 | 11/2014 | Koneru et al. |
| 2015/0040190 A1 | 2/2015 | Oberheide et al. |
| 2015/0074783 A1 | 3/2015 | Clothier et al. |
| 2015/0134956 A1 | 5/2015 | Stachura et al. |
| 2016/0269379 A1* | 9/2016 | Livesay ............ G06K 9/00288 |
| 2017/0149767 A1 | 5/2017 | Hinton et al. |
| 2017/0149770 A1 | 5/2017 | Hinton et al. |

OTHER PUBLICATIONS

From Wikipedia, Out-of-band data, https://en.wikipedia.org/wiki/Out-of-band_data, accessed Jun. 1, 2015, 2 pages.

From Wikipedia, One-time password, https://en.wikipedia.org/wiki/One-time_password, accessed Jun. 1, 2015, 6 pages.

McAfee intros single sign-on, one-time password controls for cloud, hftp://www.zdnet.com/article/mcafee-intros-single-sign-on-one-time-password-controls-for-cloud/, published Apr. 25, 2015, accessed May 29, 2015, 1 page.

Office Action (dated Apr. 10, 2017) for U.S. Appl. No. 14/950,262, filed Nov. 24, 2015, Conf. No. 8451.

Amendment (dated Apr. 27, 2017) for U.S. Appl. No. 14/950,262, filed Nov. 24, 2015, Conf. No. 8451.

Notice of Allowance (dated Jun. 21, 2017) for U.S. Appl. No. 14/950,262, filed Nov. 24, 2015, Conf. No. 8451.

\* cited by examiner

SSO FUNCTIONALITY BY MEANS OF A TEMPORARY PASSWORD AND OUT-OF-BAND COMMUNICATIONS

This application is a continuation application claiming priority to Ser. No. 14/950,262 filed Nov. 24, 2015, now U.S. Pat. No. 9,807,087, issued Oct. 31, 2017.

TECHNICAL FIELD

The present invention relates to simulating Single Sign-On (SSO) functionality for a service provided by a Service Provider that does not support true F-SSO functionality for that service.

BACKGROUND

Cloud-computing environments and enterprise networks may comprise many software applications and utilities that each requires an independent identification or authentication procedure, such as entering a username and password or identifying a security image. Higher-security applications that automatically log out inactive users may force a user to sign on and authenticate several times a day.

A Single Sign-On (SSO) function can simplify these requirements by allowing an Identity Provider (IDP) to authenticate a user and then forward user-authentication information to Service Providers within a single domain that would otherwise require an additional manual sign-on for each application, tool, software module, or other service accessed by the user. In this way, SSO may allow a user to access multiple services, without additional sign-on activity, after being authenticated a single time by the IDP.

SSO capabilities may further be "federated" in order to simplify user sign-on requirements where services are provided by a "federation" of different, and often unaffiliated, Service Providers across multiple domains. Federation for single sign-on is implemented with agreed-up interaction protocols, such as Security Assertion Markup Language (SAML), that allow for the exchange of user information, across domains based on federation-brokered trust relationships. Federated identity management allows multiple, unaffiliated IDPs to quickly respond to a Service Provider's request for to authenticate users requesting access to a service or set of services offered by the Service Provider. Similarly, federated identity management allows multiple, unaffiliated Service Providers to provide services to users associated with an Identity Provider without requiring the users to re-authenticate at each Service Provider.

Such implementations are especially effective when Service Providers, despite each maintaining a trusted relationship with a single Identity Provider, cannot directly share confidential user data across the set of Service Providers because the Service Providers themselves are not in trusted relationships with each other.

Federated SSO (F-SSO) capabilities can be expensive and complex to implement as it requires changes to a Service Provider's user authentication process. These changes are often cost-effective in environments where initial implementation costs can be spread across a larger number of users. In cases where the number of users who require F-SSO is a small percentage of the set of overall users who require access to an environment, or where the changes to the environment's native authentication process are too extensive, however, it may not be cost-effective for a Service Provider to offer F-SSO capabilities to users in that group.

One example of such an implementation might be an F-SSO federation in which a Service Provider is an Infrastructure as a Service (IaaS) provider and the class of F-SSO requiring users consists of a small number of system-management personnel representing a very small percentage of the overall set of users accessing the IaaS provider's resources. In such a case, it may not be practical to implement F-SSO for the system-management users given the costs of adding/changing the SP's environment to support F-SSO and the potential impact from a usability point of view on the remaining set of users, representing the majority of the SP's users.

BRIEF SUMMARY

A first embodiment of the present invention provides a method for using an out-of-band password to provide enhanced SSO functionality, the method comprising:

a processor of a computer system receiving notice of a user's access request from an Identity Provider (IDP) of a Federated Single Sign-On (F-SSO) federation, wherein the access request requests access to a service provided by a Service Provider (SP) of the federation, and wherein the federation does not support Single Sign-On functionality for that service;

the processor, in response to receiving the notice, identifying and validating the user;

the processor sending a temporary password to the user;

the processor updating an information repository with a value of the temporary password;

the processor detecting that the user has entered a correct value of the temporary password;

the processor generating a single-use password; and the processor communicating the single-use password to the user, such that the user may use the single-use password to access the service, and wherein the in-band communication is a secure communication that is communicated through a medium under control of the Service Provider to a device under control of the Service Provider.

A second embodiment of the present invention provides a system for using an out-of-band password to provide enhanced SSO functionality comprising a processor, a memory coupled to the processor, and a computer-readable hardware storage device coupled to the processor, the storage device containing program code configured to be run by the processor via the memory to implement a method for using an out-of-band password to provide enhanced SSO functionality, the method comprising:

the processor receiving notice of a user's access request from an Identity Provider (IDP) of a Federated Single Sign-On (F-SSO) federation, wherein the access request requests access to a service provided by a Service Provider (SP) of the federation, and wherein the federation does not support Single Sign-On functionality for that service;

the processor, in response to receiving the notice, identifying and validating the user;

the processor sending a temporary password to the user;

the processor updating an information repository with a value of the temporary password;

the processor detecting that the user has entered a correct value of the temporary password;

the processor generating a single-use password; and the processor communicating the single-use password to the user, such that the user may use the single-use password to access the service, and wherein the in-band communication is a secure communication that is communicated through a medium under control of the Service Provider to a device under control of the Service Provider.

A third embodiment of the present invention provides a computer program product, comprising a computer-readable hardware storage device having a computer-readable program code stored therein, the program code configured to be executed by a system comprising a processor, a memory coupled to the processor, and a computer-readable hardware storage device coupled to the processor, the storage device containing program code configured to be run by the processor via the memory to implement a method for using an out-of-band password to provide enhanced SSO functionality, the method comprising:

the processor receiving notice of a user's access request from an Identity Provider (IDP) of a Federated Single Sign-On (F-SSO) federation, wherein the access request requests access to a service provided by a Service Provider (SP) of the federation, and wherein the federation does not support Single Sign-On functionality for that service;

the processor, in response to receiving the notice, identifying and validating the user;

the processor sending a temporary password to the user;

the processor updating an information repository with a value of the temporary password;

the processor detecting that the user has entered a correct value of the temporary password;

the processor generating a single-use password; and the processor communicating the single-use password to the user, such that the user may use the single-use password to access the service, and wherein the in-band communication is a secure communication that is communicated through a medium under control of the Service Provider to a device under control of the Service Provider.

DETAILED DESCRIPTION

Figure 1:
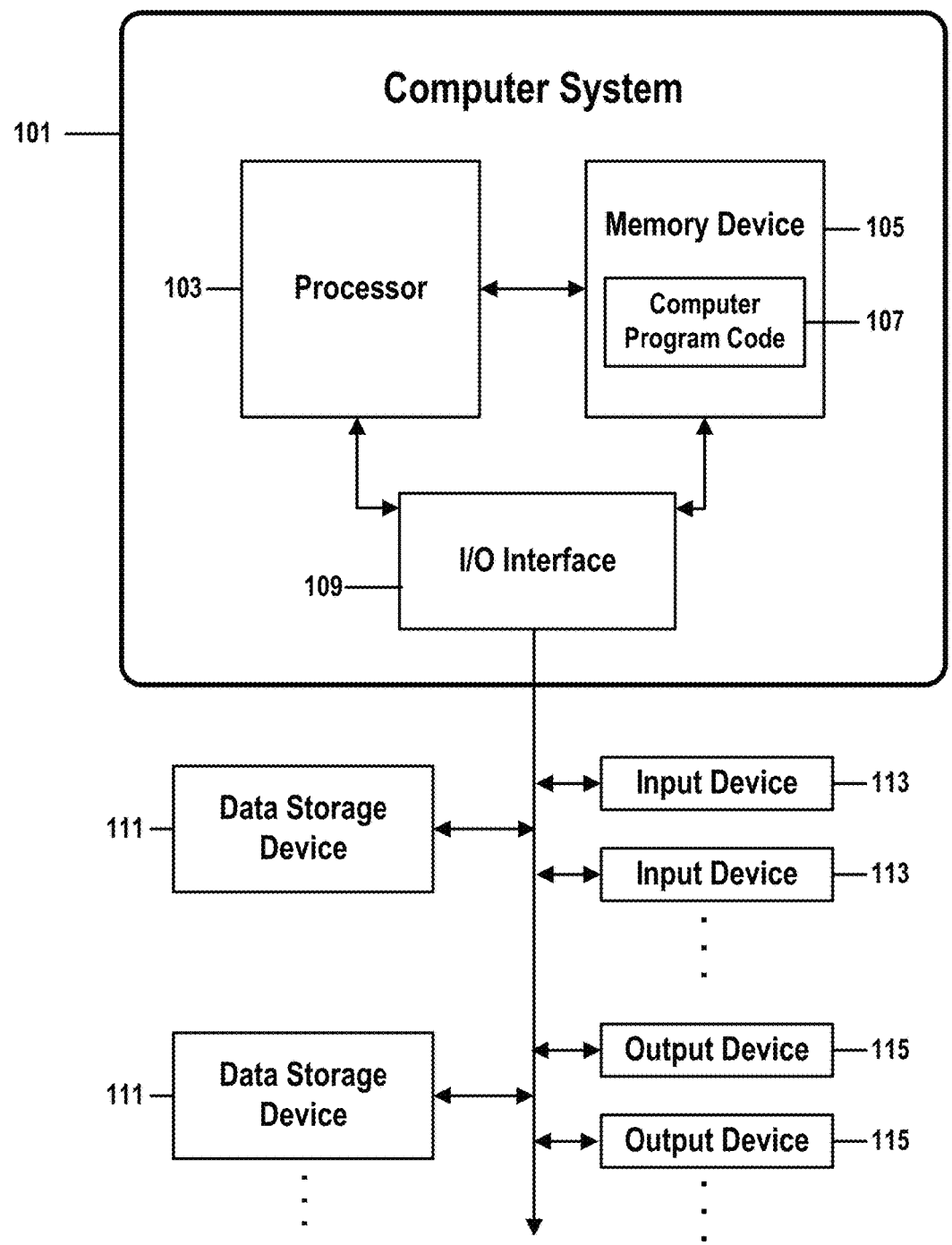
FIG. 1 shows the structure of a computer system and computer program code that may be used to implement a method for using an out-of-band password to provide enhanced SSO functionality in accordance with embodiments of the present invention.

Single sign-on (SSO) is a procedure that allows a user to log in with a single ID and gain access to multiple connected systems without being prompted for different usernames or passwords. A simple version of single sign-on can be achieved for systems with a common DNS parent domain using HTTP cookies.

Single sign-on across multiple DNS parent domains is known as Federated Single Sign-On (F-SSO). F-SSO relies on federated user identities (identities that have been linked across the domains) and standard, interoperable protocols, such as the Security Associated Markup Language (SAML) for asserting those identities and information about those identities, across disparate, but linked, domains.

A federation may comprise one or more users, one or more Identity Providers (IDP), and one or more Service Providers (SP). In such a system, when a user requests a secured service from a Service Provider, that Service Provider may in turn request information about the user from the Identity Provider. The IDP might then transmit an assertion to the SP that is then validated and used by the SP as a basis for the SP's access-control decisions associated with the user's requests. F-SSO thus frees the user from having to maintain multiple accounts that must be re-authenticated every time the user attempts to access a third-party service.

In such systems, an Identity Provider (IDP) is responsible for maintaining user authentication data and, through trusted relationships with a Service Provider, the IDP is able to assert user information to the SP, allowing the SP to authorize and manage a user session without needing to manage the user's account, authentication credentials, or authorization permissions.

An IDP may maintain trust relationships with multiple SPs, and an SP may maintain trust relationships with multiple IDPs, all of whom comprise a "federation" that may provide users SSO access to multiple systems deployed within the federation, even when those systems are deployed in different cloud-computing environments or different enterprises.

An architecture of a federation system may include:

i) One or more Service Providers that each provide one of more service, application, software tool, or other resource that may be accessed only by authenticated users;

ii) one or more Identity Providers that each maintain a trust relationship with one or more Service Providers. F-SSO allows a user to access Service Provider services by signing on to the IDP, which then independently authenticates the user and communicates that authentication, and optionally the user's role and privileges, to the intended Service Provider through a trusted relationship.

F-SSO protocols define the interaction between IDP and SP including the trust relationship between the two parties as well as the protocol exchanges required to support the various scenarios associated with federated single sign-on;

In one example, a cloud provider, such as an Infrastructure-as-a-Service (IaaS) cloud provider, may act as a Service Provider for tens, thousands or more clients, where each of these clients desires to act as an Identity Provider to the cloud provider's resources for the client's privileged users. In a typical implementation, each client must establish and manage its users at the cloud provider side, where a Client acts as an Identity Provider and a cloud provider acts as a Service Provider. In this implementation the cloud provider must manage user accounts, including passwords and credentials, for thousands or even tens of thousands of users from hundreds or thousands of Identity Providers.

Implementing F-SSO in such an environment would decrease the burden on users who wish to access the cloud provider's resources. Here, a cloud provider will act as a Service Provider (SP) and will maintain trust relationships with each of the cloud provider's clients, where each client will act as an federated Identity Provider (IDP). When the number of federation partners that either an SP or an IDP must manage is small, and the users participating in the federation for each partner is large, the operational burden of managing these trust relationships is something that can be justified. When the federation becomes more one-sided, such as one Service Provider with thousands of IDP partners, the burden of managing many trust relationships is disproportionally born by the SP. Further, if each IDP has a small number of users, the cost of managing the trust relationship is not amortized by the SP over a large number of users. In this scenario the cost to support federation natively in a login portal becomes difficult to justify, especially when the portal and environment would require significant changes to support F-SSO protocols.

SSO functionality can be implemented in many ways, and the general guidelines discussed above describe just one class of F-SSO implementation. Embodiments of the present invention operate within a particular type of F-SSO platform, in which a Service Provider is unable to offer SSO capabilities to a certain class of user of a certain service. In such cases, embodiments provide a simple solution that allows the SP to simulate many of the benefits of a full F-SSO implementation, relying on an IDP to manage user authentication information. Furthermore, embodiments of the present invention may be implemented by adding a simple module to the SP's existing system, and without modification to any F-SSO procedure implemented by the IDP.

Figure 2:
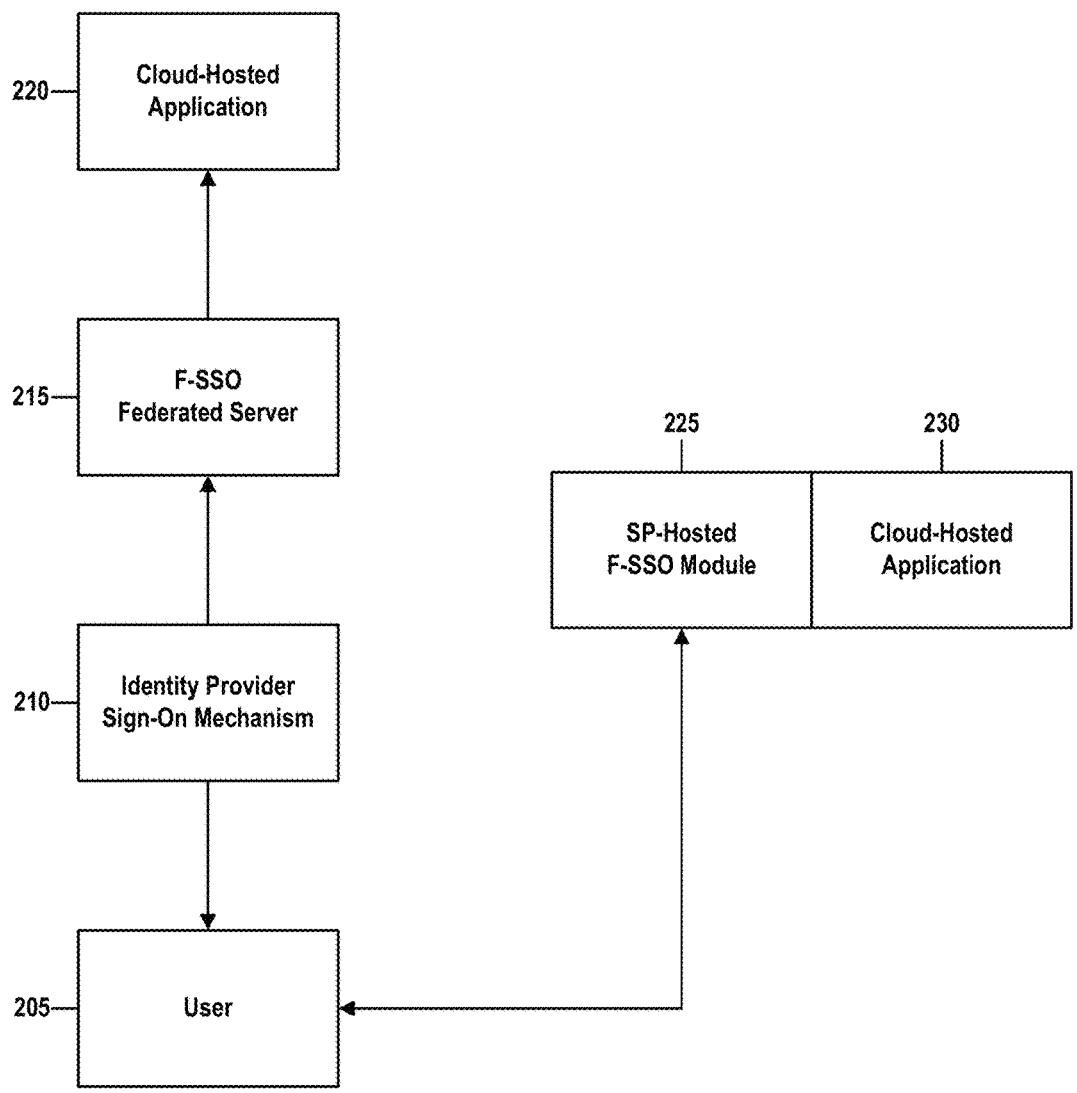
FIG. 2 shows a conventional Federated Single Sign-On system (F-SSO) architecture.
Figure 3:
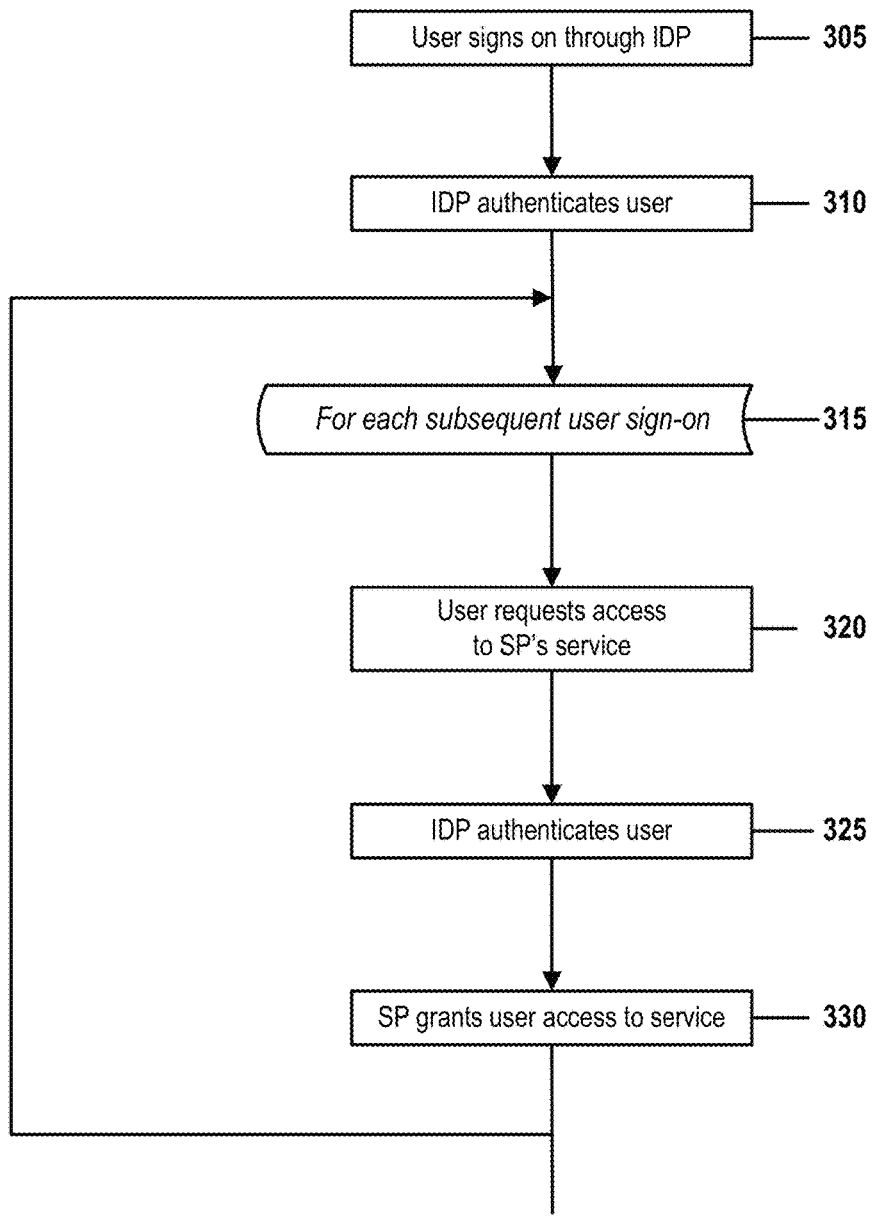
FIG. 3 is a flow chart that illustrates steps by which the conventional Federated Single Sign-On system architecture of FIG. 2 operates.
Figure 4:
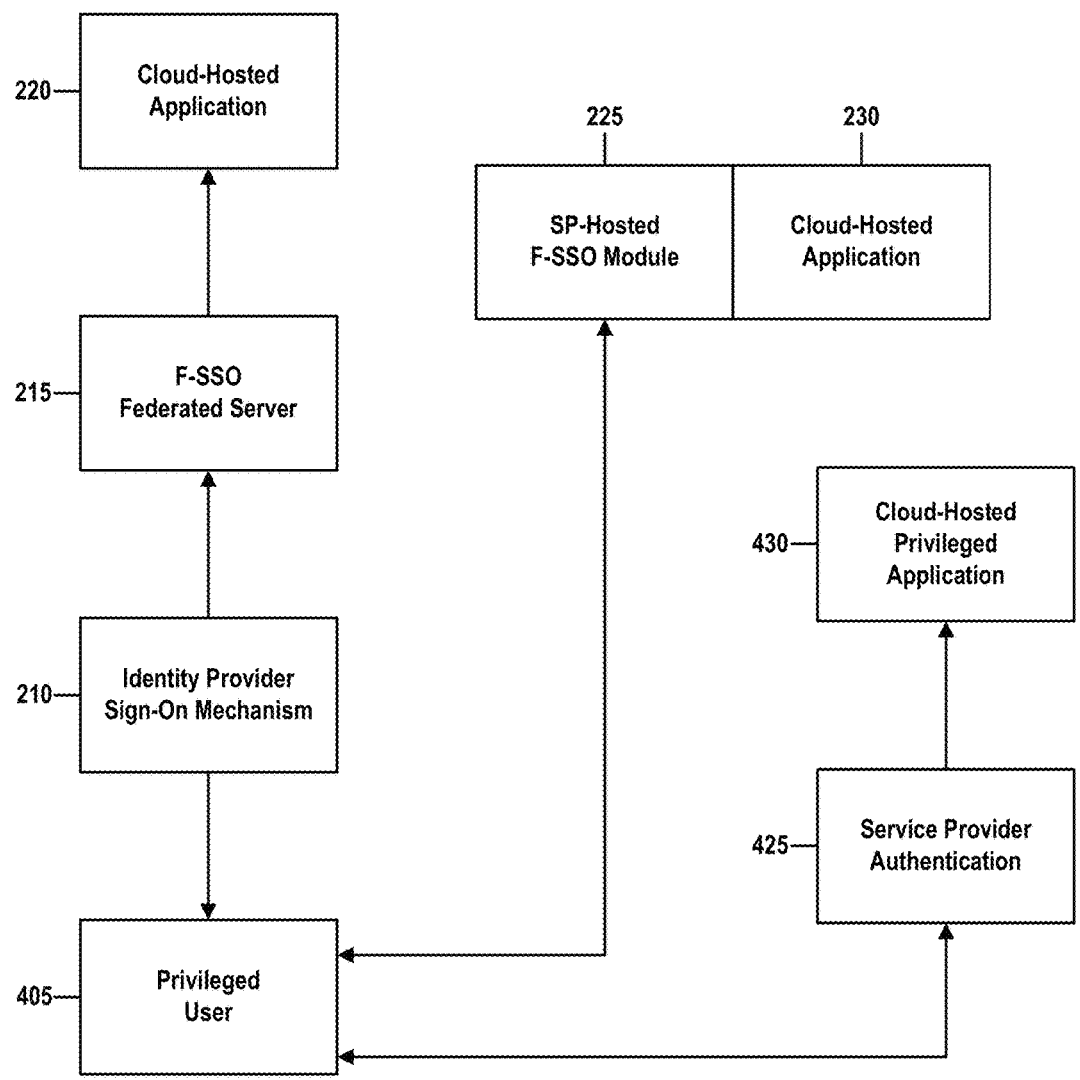
FIG. 4 illustrates how a conventional Federated Single Sign-On system architecture fails to accommodate privileged users.

Embodiments of the present invention are designed to work within one particular class of F-SSO implementations, which are described in FIGS. 2-4. Although embodiments may not interact in the same way with federations that comprise different procedures, core concepts disclosed herein may be adapted to many other types of approaches to providing SSO capability.

FIG. 1 shows a structure of a computer system and computer program code that may be used to implement a method for using an out-of-band password to provide enhanced SSO functionality in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for using for using an out-of-band password to provide enhanced SSO functionality in accordance with embodiments of the present invention, and may implement other embodiments described in this specification, including the methods illustrated in FIGS. 1-6. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for using an out-of-band password to provide enhanced SSO functionality.

Any of the components of the present invention could be created, integrated, hosted, maintained, deployed, managed, serviced, supported, etc. by a Service Provider who offers to facilitate a method for using an out-of-band password to provide enhanced SSO functionality. Thus the present invention discloses a process for deploying or integrating computing infrastructure, comprising integrating computer-readable code into the computer system 101, wherein the code in combination with the computer system 101 is capable of performing a for using an out-of-band password to provide enhanced SSO functionality using an out-of-band single-use password to provide SSO functionality.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for using an out-of-band password to provide enhanced SSO functionality may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for using an out-of-band password to provide enhanced SSO functionality data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 shows a conventional Federated Single Sign-On system (F-SSO) architecture. FIG. 2 comprises elements identified by reference numbers 205-230.

In the exemplary implementation of this figure, a user 205 wishes to sign onto an application 230 that is provided, hosted, or otherwise managed by a Service Provider or otherwise exists within a separate domain.

In this example, this application might be a Web site hosted on a cloud platform provided an cloud provider, but F-SSO functionality may implemented in conjunction with many other types of applications, computing environments, and Service Providers.

Without single sign-on capabilities, a user 205 who wants to access multiple services, each of which may be provided by a different, unrelated Service Provider, may be forced to sign on repeatedly with different log-in credentials or perform independent authentication procedures in order to access each service.

In the F-SSO system of FIG. 2, the user would instead sign on to a portal, Web site, mobile-device app, or other log-on mechanism 210 of an Identity Provider (IDP). The IDP is an entity that provides F-SSO functionality by managing trusted relationships among Service Providers and between Service Providers and trusted users.

Here, when the user 205 signs on to the IDP, the IDP authenticates the user's identity and determines that the IDP in a trusted relationship with one or more Service Providers This authentication and determining of federation participation may be performed by means of previously stored data that the IDP maintains in its Federated Server 215.

Once the IDP has authenticated user 205 as being able to leverage the trust relationship with the Service Provider, the IDP builds the appropriate F-SSO protocol and messages and redirects the user to the Service Provider. In this example, the Cloud Service Provider hosted application 230 has been enabled for F-SSO through F-SSO module 225, which may be embedded within application 230 or may be an independent entry point of application 230, and so the F-SSO protocol and message is received directly at the Cloud SP-hosted application. The cloud SP-hosted application's F-SSO module 225 identifies the user as an authenticated, trusted user and permits the user to access the secured application or other service 230. For clarity, the Cloud hosted application 230 and F-SSO module 225 are part of a trust relationship with the Identity Provider and independent of the cloud provider itself as a cloud-services Service Provider.

Once the IDP has authenticated user 205, the IDP may repeat this procedure with other Service Providers that control access to other secured applications or services 230. When the user 205 attempts to access those other applications or services, the IDP acts as an intermediary, confirming to those other applications or services that the user has already been identified and authenticated.

In this way, F-SSO functionality allows a user 205 to access multiple services with a single sign-on to an IDP.

Variations of this method may allow the user 205 to access other services by merely entering an authenticated username, by entering some other combination of credentials (such as a username/password combination, or an identification of a displayed image), or by other means that, despite requiring a partial or limited sign-on, does not require additional authentication from each other service or application. This may be especially beneficial in a secured environment in which applications normally require a multistep authentication procedure.

In yet other variations, an IDP may, after authenticating a user 205, may still require the user to sign on to other trusted applications or services, but may allow the authenticated user to sign on to each application or service 220 with a same username, password, or other credential. Such implementations may be beneficial in environments in which users 205 access many applications or services, each of which requires a different set of sign-on credentials.

The precise benefits provided to a user 205 by F-SSO may be implementation-dependent and may be a function of how Service Providers prioritize business, security, and ease-of-use considerations.

But in all cases, an IDP implementing Federated SSO stores user credentials in its own server in order to partially or completely free a user 205 from having to perform a full sign-on and authentication procedure every time that the user 205 attempts to access a trusted application or service 220 or 230. In such a federated implementation, those trusted applications or services 230 may be provided by multiple Service Providers that may themselves not be in trust relationships with each other. In other words, with F-SSO, the user 205 provides credentials only to the Identity Provider and the Service Providers validate an identity of that user 205 based solely on information received from the Identity Provider.

FIG. 3 is a flow chart that illustrates steps by which the conventional Federated Single Sign-On system (F-SSO) architecture of FIG. 2 operates. FIG. 3 contains steps 305-330.

In step 305, a user 205 who desires to use one or more applications or services 220 each provided by a Service Provider initiates an identification and authentication process by means of the Identify Provider's sign-on mechanism 210.

In step 310, the Identity Provider (IDP), using user credentials stored at the IDP side, authenticates the user 205 through an implementation-dependent authentication procedure. This procedure may require any combination of identification or authentication means known in the art, such as a username/password combination, biometric markers, or keyfobs.

Step 315 begins a procedure of steps 315-330, by which the authenticated user 205 may then gain access to any of a number of different Service providers that are in a trust relationship with the IDP. User 205 may repeat the sequence 315-330 once for each different Service Provider. At the conclusion of the final iteration, user 205 will have been granted access to all authorized Service Provider resources 230, where the Service Provider may expose one or more services to the user based on the trust relationship between the Service Provider and Identity Provider.

In step 320, the authenticated user 205 requests access to a secured service 230 provided by one or more of the Service Providers that are in trusted relationships with the Identity Provider. The user 205 may request this access by linking to or entering a URL or by other means known to those skilled in the art. The user 205 does not, however, initiate an authentication procedure with the provider of the service 230 that the user 205 wishes to access.

In step 325, the Service Provider, rather than requiring the user 205 to authenticate itself by means of the Service Provider's standard authentication procedures, requests confirmation of the user's identity from the IDP. The IDP, having already identified and authenticated the user 205, determines by means of user-related information stored on the IDP's federated server that the user 205 is authorized to access the requested service 230. The IDP then, by means of its trusted relationship with the Service Provider, notifies the Service Provider that the user 205 has been authenticated and is authorized to access the requested service 230.

In step 330, in response to the IDP's notification, the Service Provider grants the user 205 access to the requested service 230.

FIG. 4 illustrates how a conventional Federated Single Sign-On system (F-SSO) architecture of FIGS. 2 and 3 fails to accommodate privileged users. FIG. 4 comprises elements identified by reference numbers 210-230 and 425-430. Items 210-230 are similar in function and structure to identically numbered items in FIG. 2. As in FIG. 2, items 210-230 show an F-SSO mechanism whereby an Identity Provider/Client's portal or other log-in mechanism 210 accepts user credentials that are then used by the Client's Identity Provider functionality to look up information stored on the Client's Identity Provider federated server 215 in order to authenticate the user 205 to a user-desired application or other service 230 as managed by the Client through a federated server 225 as managed by the Client for Service Provider functionality.

FIG. 4 shows how a privileged user 405, such as a cloud-management specialist, network administrator, or other user with higher-valued credentials may try to access that a privileged application 430 hosted in the same cloud provider hosting environment as application 230, where application 430 is managed by the cloud provider. FIG. 4 shows reference items 210-230 and 405-415. Items 210-230, are functionally and structurally similar to identically numbered items in FIG. 2.

As mentioned earlier, implementing F-SSO functionality to support a class of users that represents a small set of a total set of users may not justify the significant upfront implementation costs that may comprise costs of information-gathering, coding and design, and modification of the existing authentication process and infrastructure deployment. When a Service Provider serves a customer that comprises a very large number of users, all of whom require F-SSO functionality, adding F-SSO by means of one or more third-party Identity Providers may be made cost-effective by amortizing those implementation costs across a large user base.

But this economics of scale generally does not transfer to privileged users who, by their nature, may be far fewer in number than are general users. Consequently, sophisticated federated SSO capabilities may not be offered to support these users and the applications required by such privileged users.

As shown in FIG. 4, such a privileged user 405 must then access a Service Provider's service or application 430 through direct sign-on via the Service Provider's sign on portal 425. Once signed on, the user is routed through conventional means to connect the user to other services. If the privileged service 430 is a high-security application, as is often the case for services that serve privileged users, the privileged user 405 may have to sign on to authentication service 425 repeatedly during one session due to security related automatic log-offs or requirements for re-authentication for each privileged action request. The privileged user 405 may also have to sign on and be authenticated for other service or application 230, even if both 425 are accessed in order to perform different steps of a same task.

In one example, a privileged user 405 may be a cloud-management specialist who wishes to use a cloud-management tool 430, operating within a cloud-management environment provided and maintained by an Infrastructure-as-a-service (IaaS) provider or other type of cloud-service provider Service Provider to re-provision resources of a cloud-based Web application 230.

Here, the specialist 405 would have to sign onto the tool 425 in order to instruct the cloud-management platform 430 to reprovision resources for the cloud application 230. This task may comprise switching several times between multiple tools, requiring the specialist 405 to sign on again to one or more applications or tools after each switch. Every time the specialist 405 takes a break or is interrupted by another task, the management tool 425 might automatically log him off (or security procedures might require the specialist 405 to manually log off), requiring yet another sign-on and authentication after each log-off. Such a scenario may conflict with an internal security policy of an Identity Provider that requires the Identity Provider to always manage the user's password and security status. As described, however, this requirement for constant re-authentication by a Service Provider requires either that the Service Provider 425 manage an authenticatable account for the privileged user, and thus control the privileged user's security status at the Service Provider, or that the Identity Provider and Service Provider engage in multiple F-SSO flows to accommodate the privileged user's re-authentication requirements.

If the cloud-hosted privileged application 430 is enabled for single sign-on, allowing the Identity Provider to retain control of privileged user's 405 security status, a repeated requirement for re-authentication cannot be optimally satisfied by means of an F-SSO based approach. Consider, for example, a case in which a privileged application 430 is enabled for F-SSO using F-SSO module 425, analogous to the enablement of cloud application 230 using F-SSO module 225. In this scenario, the requirement for repeated re-authentication can only be satisfied by repeated requests for F-SSO between the Identity Provider's F-SSO module 215 and the privileged application's F-SSO module 425. This means that every time user 405 must re-authenticate, the Service Provider must again request the F-SSO information from the Identity Provider.

As will be described below, embodiments of the present invention may not provide true Federated Single Sign-On capability to such a privileged user 405, but may comprise a mechanism by which a Service Provider, rather than an IDP, may provide functionality mimicking that of F-SSO to its users, while allowing the IDP to retain ongoing security-status control of privileged user 405.

Figure 5:
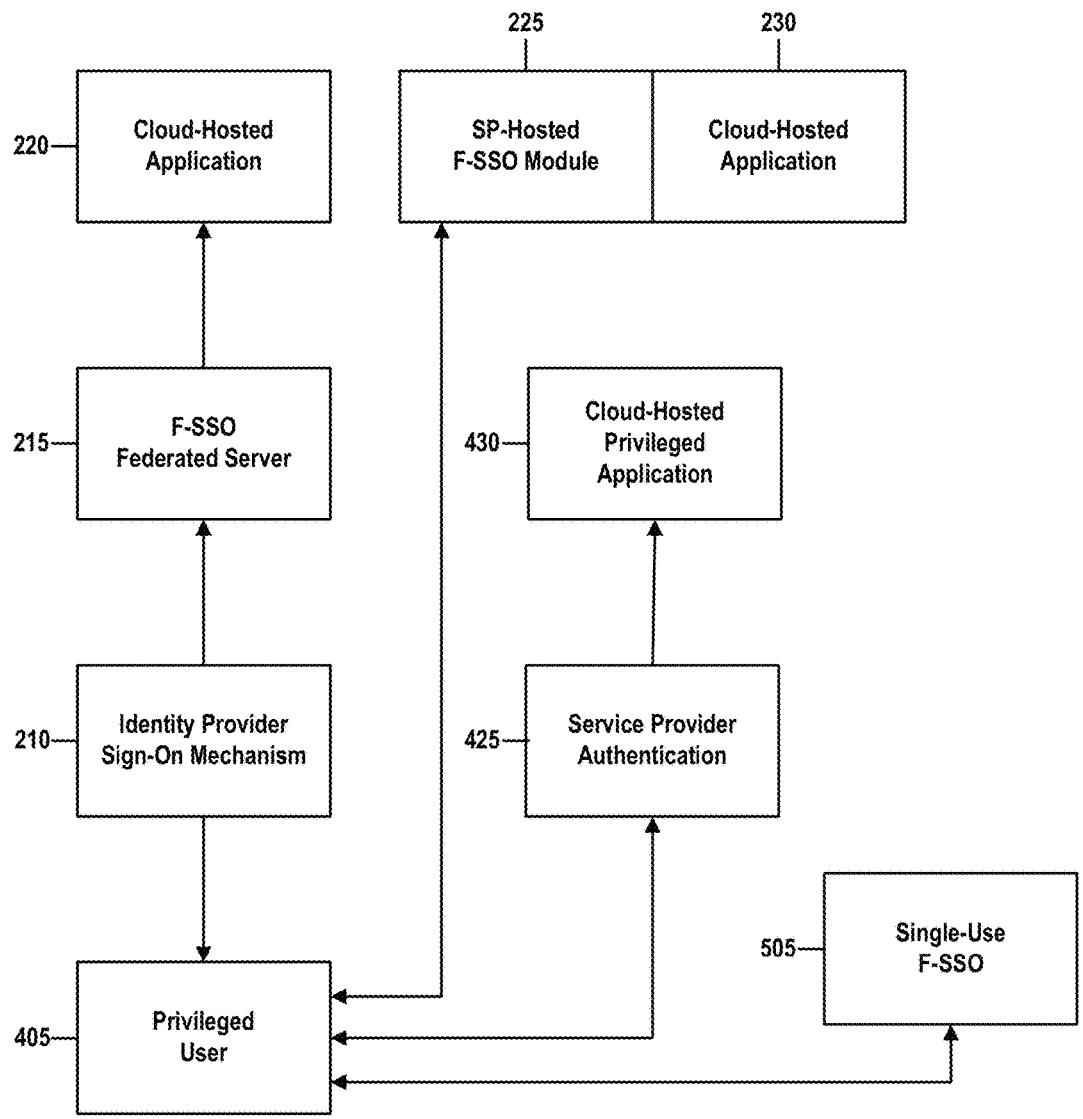
FIG. 5 shows an architecture of a system for using an out-of-band password to provide enhanced SSO functionality, in accordance with embodiments of the present invention.

FIG. 5 shows an architecture of a system for using a temporary password to extend F-SSO functionality, in accordance with embodiments of the present invention. FIG. 5 references items 210-230, 425-430, and 505. Items 210-230 and, 425-430 are functionally and structurally similar to identically numbered items in FIGS. 2 and 4.

As mentioned earlier, there are many ways to implement Single Sign-On and Federated Single Sign-On systems. Certain embodiments of the present invention are designed to complement F-SSO systems similar to those described in FIGS. 5 and 6.

As described above, conventional F-SSO functionality is provided by an Identity Provider (IDP) in conjunction with each Service Provider (SP) that provides a service intended to offer single sign-on capabilities to users.

In one example, a dozen Software-as-a-Service (SaaS) Service Providers may each provide a cloud-based Web service, such as a search engine, a subscription-based streaming-media site, or a mobile-device app store. In addition, an Infrastructure-as-a-Service (IaaS) service provider may provide a cloud-computing infrastructure on which each of these Web services is deployed, as well as cloud-management tools that let its SaaS customers maintain their hosted services.

These Service Providers may have no common affiliation and may even be competitors. In other cases, certain SP's may have different levels of security clearance, or may be based in different countries. There may thus be no common trust relationship between certain pairs of SP's, making it unlikely that they would share user credentials like passwords or user-account records.

F-SSO addresses these issues by establishing a set of trust relationships between the Identity Provider and each Service Provider. When a user of a Service Provider signs onto the IDP, that user is authenticated by the IDP as a function of stored user-authentication data and rules. The IDP, by means of its trust relationship with each SP, then identifies the authenticated user to each SP that provides a service the user wishes to access.

As shown in FIG. 3, however, F-SSO may not be practical when a Service Provider's user base is too small to justify the expense and effort needed by an SP to provide F-SSO functionality to those users or when the user's required interaction requires multiple repeated F-SSO interactions over a short period of time. This is generally the case with high-priority or privileged users, such as cloud-management specialists or systems analysts, who may be outnumbered by general users by several orders of magnitude. In some embodiments, F-SSO may be available to users of SaaS Service Providers, which may each serve hundreds of thousands or millions of users, but not be possible for privileged users of an IaaS service that may have hundreds, or even tens of privileged users.

Figure 6:
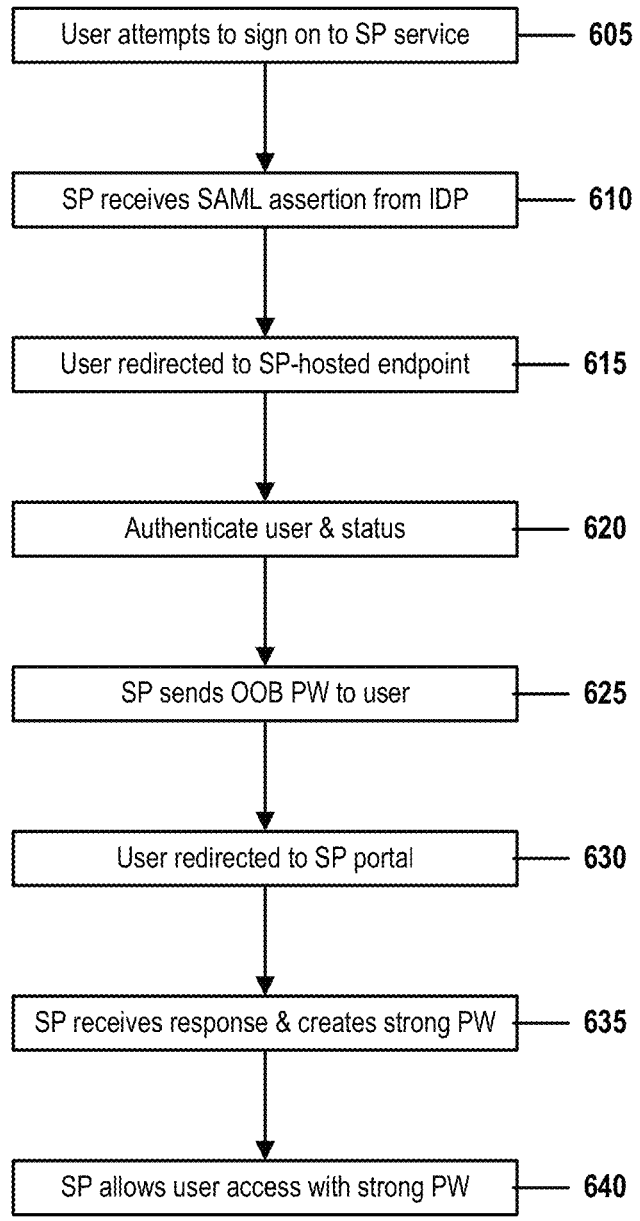
FIG. 6 is a flow chart that illustrates steps of a method for using an out-of-band password to provide enhanced SSO functionality, in accordance with embodiments of the present invention.

Embodiments of the present invention, as illustrated in FIGS. 5 and 6, mitigate these issues by partially duplicating the benefits of true F-SSO implementations. In other words, unlike true F-SSO, where an IDP authenticates a user, the present invention allows a Service Provider, by means of a small application, to authenticate the user for those services that may not be enabled for F-SSO and then communicate its authentication for these services to the IDP through a trusted connection between the SP and the IDP.

FIG. 5 illustrates an architecture of such an embodiment of the present invention.

Item 210 and 215 identify a sign-on or interface mechanism of an Identity Provider that manages authentication and security-management tasks in an F-SSO implementation.

Item 230 identifies a software application or service that is provided or hosted by at Service Provider, such as an online-search provider or another SaaS service provider, but is managed by an entity other than the cloud provider as Service Provider.

Item 430 identifies a software application or service that is provided or hosted and managed by a Service provider, such as an online search provider or another SaaS provider, acting as a Service Provider in a trust relationship with user 405's Identity Provider.

Item 405 identifies a privileged user, such as a cloud-management specialist, that wishes to access one or more privileged services of a Service Provider that will in turn require access to application or service 230 and 430.

The system shown in FIG. 5, by means of methods described in FIG. 6, adds functionality to the system of FIG. 4. This added functionality allows privileged user 405 to gain single sign-on access to privileged service 430 without requiring the SP to provide F-SSO support for service 430 or to the privileged class of users that are required to access 430 to which user 405 belongs.

This added functionality is provided by a "Stand-Alone SSO" (SA-SSO) client software module 505, which uses known software tools to provide F-SSO-like capabilities to the SP's privileged user 405.

Unlike F-SSO systems in which an IDP and a SP generally exchange only authentication data by means of a specialized protocol (such as the Security Assertion Markup Language), SA-SSO module 505 may interact with the Identity Provider 210, with the user 405, and with the underlying privileged application 430 by means of standard Web browsers, text messages, and standard Application Programming Interfaces.

At one point in the method of FIG. 6, for example, the SA-SSO module 550 may communicate with privileged user 405 by means of an out-of-band communication, such as an email message or an SMS-based smartphone text message.

FIG. 6 is a flow chart that illustrates steps of a for using an out-of-band password to provide enhanced SSO functionality using an out-of-band single-use password to provide SSO functionality in accordance with embodiments of the present invention. FIG. 6 comprises steps 605-640.

In step 605, one or more processors or computer systems determine that privileged user 405 is attempting to access a privileged service 430 provided by a Service Provider (SP). As explained in the previous figures, this step might entail a system engineer or other type of specialist 405 attempting to access a network-management, cloud-management, or other type of system-management utility.

In some embodiments, the user 405 may attempt to perform this sign-on through normal means, such as logging in through the Service Provider's standard log-in screen by means of an HTTP-enabled World Wide Web browser application, or by other known means, such as biometric identification.

In other embodiments, the user 405 may attempt to perform the sign-on through a means known by the user to allow the user 405 to provide authentication credentials to an interface 210 of the Identity Provider (IDP).

In step 610, regardless of how the IDP becomes aware of the user's attempt to sign on, the processor receives from the IDP, in response to the user's sign-on attempt, an SAML assertion that the IDP has built and communicated in its normal manner. Here, such an assertion may be a message to the SP that conforms to the SAML authentication protocol and notifies the SP of the user's attempt to sign on to the SP's privileged service.

In a full F-SSO implementation, the SP would respond to the IDP by initiating communications that would result in the SP allowing user 405 authenticated access to the privileged service 430 as a function of an authentication procedure performed by the IDP. Here, however, the Service Provider has not implemented the functionality necessary to complete such interaction with the privileged application through standard F-SSO mechanism.

Embodiments of the present invention address this lack of F-SSO functionality by adding to the SP a Stand-Alone Federated Single Sign-On (SA-SSO) module 505 that intercepts a SAML message or other communication received from the IDP. Module 505 performs steps performed by an F-SSO-enabled Service Provider, the interception is tailored to complement the IDP's normal F-SSO procedures, such that the IDP is not aware that not all of the SP's applications are contained within the SP's SAML assertion handling in a way expected by the IDP.

In step 615, the processor, in response to the sign-on attempt of step 605, or in response to the receipt of the SAML assertion in step 610, redirects user 405 to a client-specific endpoint. This client-specific endpoint may be designed by any known means and the exact function, scope, interface mechanism, platform, and appearance of this endpoint may be implementation-specific.

This endpoint may be considered to be client-specific because it may be tailored to a particular class of users to which the privileged user 405 belongs. In one example, if a cloud-management specialist attempts to log on, by means of an HTTP-based Web browser, to a resource-optimizing tool of an IaaS provider of virtual infrastructure services, the SA-SSO module 505 may respond in step 615 by using conventional HTTP, Java, or other Web-compliant instructions to redirect user 405 from the original sign-on Web page to a "client-specific" Web page that is designed for all cloud-management specialists who work for the same client company served by the IaaS Service Provider. This client-specific page might, for example, be made specific to the cloud-management personnel of the SP's client company by providing look-and-feel tailored to the client company, by providing a direct interface to authentication, account, or authentication information associated with that company's cloud-management personnel, or may initiate user-authentication and identification procedures specific to that client company's internal policies.

In step 620, the SA-SSO module 505 may unpack the received SAML, or other protocol, assertion received from the IDP in step 610, and in response attempt to identify and authenticate the privileged user 405. This identification and authentication may comprise technologies, techniques, and methods known to those skilled in the art, and may be selected as a function of implementation-dependent goals and constraints.

Module 505 then attempts to confirm that privileged requesting user 405 is associated with a currently active privileged account and has permission to access privileged service 430. If the user does not correspond to an active privileged user account or does not have permission to access privileged service 430, the processor terminates the method of FIG. 6 and user 405 is denied access to the privileged service 430.

In step 625, the processor, by means of the SA-SSO module 505, generates or receives a temporary password and transmits it to the user 405. In some embodiments, this transmission may be performed by means of an out-of-band transmission mechanism. In some embodiments, this password may be required to meet implementation-specific requirements for strength or robustness.

The password may be received by the processor from another module of the Service Provider's software, or the processor may itself create a password using means known in the art for generating strong passwords. If received from the other SP module, the password may be communicated from the other module to the SA-SSO module 505 by means of conventional Application Programming Interface (API) system calls or other communications internal to the Service Provider. In some cases, API or other communications may pass between Service Provider modules via an underlying communications mechanism of the Information Management System 415. Other means, as known in the art, of generating a strong password and passing it to the SA-SSO module 505 may be used.

The out-of-band communications mechanism used to communicate the strong password to the user may comprise any combination of mechanisms known in the art that does not comprise conventional F-SSO-style communications between the SP and the IDP or between the user 405 and the IDP.

The out-of-band communications might, for example, comprise transmitting the password, a URL of a Web page that displays the password, or a URL of a Web page that contains a link to the password to the user's smartphone or mobile device by means of a Short Messaging Service (SMS) text message. The out-of-band communications might also comprise requiring the user to call a phone number where a synthesized voice might read the password or further authenticate the user 405 prior to allowing the user 405 access to the password.

In step 630, the processor redirects the user 405 from the SU-SSO module 405 to the log-on portal 425 of the privileged service 430. As in step 615, this redirecting may be done by any means known in the art, but in certain embodiments, it may be accomplished easily with HTTP code that directs a Web browser to perform a standard redirection operation.

In step 635, the user 405 enters into the log-on screen of the portal of the privileged service 405 the temporary password or other credentials received through the out-of-band communication in step 625. In response, the Service Provider may in some embodiments further authenticate the user as a function of the information entered by the user 405 in this step. The processor of the Service Provider will then create a new strong password that meets security requirements as stringent as are required by the Service Provider.

In step 640, upon receiving a subsequent sign-on request that comprises entry of the strong password created in step 635, the processor initiates a session of the privileged service 425 that provides user 405 access to the resources and services requested in step 605.

The processor may discard the password or other credentials sent to the user 405 in step 625 via an intrinsically less secure out-of-band communications medium. The new strong password will have never been exposed to an out-of-band communication and, in subsequent steps, may be forwarded to the IDP for storage in the IDP's federated server 215 or for association with data stored in the federated server 215.

In some embodiments, this second strong password may then be used by the Service Provider to simulate single sign-on capabilities among applications and services within the Service Provider's trust domain (that is, among applications and services provided by entities that are in trusted relationships with the Service Provider).

In some embodiments, this second trusted password may allow the Service Provider and IDP to work together to provide a degree of F-SSO capability to the privileged user 405, using at least some of the IDP's standard methodologies, communications mechanisms, and technologies.

In some embodiments, the SA-SSO module 505 may also include a "listening" component that monitors other Service Provider modules to determine whether a status of privileged user 405 has changed. Such a status change might, for example, comprise a reassignment of user 405's job function, termination of the user 405's employment, or other changes that might affect the user 405's permissions, security status, authentication procedure, or other characteristics that might determine whether the user 405 is still authorized to access the privileged service 425.

What is claimed is:

1. A method for using an out-of-band password to provide enhanced SSO functionality, the method comprising:
   a processor of a computer system receiving notice of a user's access request from an Identity Provider (IDP) of a Federated Single Sign-On (F-SSO) federation, where the access request requests access to a service provided by a Service Provider (SP) of the federation, and where the federation does not support Single Sign-On functionality for that service;
   the processor, in response to receiving the notice, identifying and validating the user;
   the processor sending a temporary password to the user through an out-of-band communications method, where the user is required to perform an additional authentication procedure when re-entering the temporary password;
   the processor updating an information repository with a value of the temporary password;
   the processor detecting that the user has entered a correct value of the temporary password;
   the processor generating a single-use password; and
   the processor communicating the single-use password to the user, such that the user may use the single-use password to access the service, and where the in-band communication is a secure communication that is communicated through a medium under control of the Service Provider to a device under control of the Service Provider.

2. The method of claim 1, where the temporary password is subject to constraints selected from the group consisting of:
   limiting the temporary password to a certain number of uses;
   limiting the temporary password to use during a single session of the secured service;
   limiting the temporary password to use during a specified period of time; and
   limiting the temporary password to use during a specified duration of time after the first use of the temporary password.

3. The method of claim 2, where the out-of-band communication method comprises a communication sent to a destination that is not part of the F-SSO federation and that is not under control of the Service Provider, and where the out-of-band communication is selected from a group consisting of: a voice message; a fax; an SMS text message; an email message; a communication to a social-media service; an instant message; and a communication sent through the Internet to a software program running on a device that is accessible to the user.

4. The method of claim 1, where the out-of-band communications method is selected from the group consisting of:
   transmitting the password to a smartphone or mobile device by means of a Short Messaging Service (SMS) text message, where the smartphone or mobile device is distinct from the computer system;
   transmitting to a smartphone or mobile device a Web page that identifies the password, where the smartphone or mobile device is distinct from the computer system;
   transmitting to a smartphone or mobile device, by means of a Short Messaging Service (SMS), a text message that identifies a URL of a Web page that identifies the password, where the smartphone or mobile device is distinct from the computer system; and
   reading the password, by means of a synthesized voice, to the user during a phone call initiated by the user.

5. The method of claim 1, where the identifying and validating the user comprises:
   the processor, in response to the receiving notice, requesting that the IDP identify and authenticate the user;
   the processor redirecting the user to a portal under control of the IDP;
   the processor receiving authentication data from the IDP, and
   the processor redirecting the user to a portal under control of the SP.

6. The method of claim 1, further comprising:
   the processor storing a copy of the temporary password in an enterprise directory under control of the SP;

the processor, upon receiving from the user the response to the sending, where the response is a password entered by the user, attempting to match the entered password with the password stored in the enterprise directory; and the processor, deeming the user to have been identified and authenticated as a result of having successfully matched the entered password to the stored password.

7. The method of claim 1, where the Service Provider is an Information as a Service cloud-service provider, the service is a cloud-based service deployed and controlled by the Service Provider on cloud infrastructure under control of the Service Provider, and the IDP is a client of the Service Provider that controls an application deployed on cloud infrastructure under control of the Service Provider.

8. The method of claim 1, further comprising:

the processor selecting the temporary password as a function of the user's location, where the user's location comprises an Internet Protocol address of a device by which the user entered the sign-on request.

9. The method of claim 1, further comprising providing at least one support service for at least one of creating, integrating, hosting, maintaining, and deploying computer-readable program code in the computer system, where the computer-readable program code in combination with the computer system is configured to implement the receiving notice, the identifying and validating, the sending, the updating, the detecting, the generating, and the communicating.

10. A system for using an out-of-band password to provide enhanced SSO functionality comprising a processor, a memory coupled to the processor, and a computer-readable hardware storage device coupled to the processor, the storage device containing program code configured to be run by the processor via the memory to implement a method for using an out-of-band password to provide enhanced SSO functionality, the method comprising:

the processor receiving notice of a user's access request from an Identity Provider (IDP) of a Federated Single Sign-On (F-SSO) federation, where the access request requests access to a service provided by a Service Provider (SP) of the federation, and where the federation does not support Single Sign-On functionality for that service;

the processor, in response to receiving the notice, identifying and validating the user;

the processor sending a temporary password to the user through an out-of-band communications method, where the user is required to perform an additional authentication procedure when re-entering the temporary password;

the processor updating an information repository with a value of the temporary password;

the processor detecting that the user has entered a correct value of the temporary password;

the processor generating a single-use password; and the processor communicating the single-use password to the user, such that the user may use the single-use password to access the service, and where the in-band communication is a secure communication that is communicated through a medium under control of the Service Provider to a device under control of the Service Provider.

11. The system of claim 10, where the temporary password is subject to constraints selected from the group consisting of:

limiting the temporary password to a certain number of uses;

limiting the temporary password to use during a single session of the secured service;

limiting the temporary password to use during a specified period of time; and limiting the temporary password to use during a specified duration of time after the first use of the temporary password.

12. The system of claim 10, where the out-of-band communications method is selected from the group consisting of:

transmitting the password to a smartphone or mobile device by means of a Short Messaging Service (SMS) text message, where the smartphone or mobile device is distinct from the computer system;

transmitting to a smartphone or mobile device a Web page that identifies the password, where the smartphone or mobile device is distinct from the computer system;

transmitting to a smartphone or mobile device, by means of a Short Messaging Service (SMS), a text message that identifies a URL of a Web page that identifies the password, where the smartphone or mobile device is distinct from the computer system; and reading the password, by means of a synthesized voice, to the user during a phone call initiated by the user.

13. The system of claim 10, where the identifying and validating the user comprises:

the processor, in response to the receiving notice, requesting that the IDP identify and authenticate the user;

the processor redirecting the user to a portal under control of the IDP;

the processor receiving authentication data from the IDP, and the processor redirecting the user to a portal under control of the SP.

14. The system of claim 10, further comprising:

the processor storing a copy of the temporary password in an enterprise directory under control of the SP;

the processor, upon receiving from the user the response to the sending, where the response is a password entered by the user, attempting to match the entered password with the password stored in the enterprise directory; and the processor, deeming the user to have been identified and authenticated as a result of having successfully matched the entered password to the stored password.

15. The system of claim 10, further comprising:

the processor selecting the temporary password as a function of the user's location, where the user's location comprises an Internet Protocol address of a device by which the user entered the sign-on request.

16. A computer program product, comprising a computer-readable hardware storage device having a computer-readable program code stored therein, the program code configured to be executed by a system comprising a processor, a memory coupled to the processor, and a computer-readable hardware storage device coupled to the processor, the storage device containing program code configured to be run by the processor via the memory to implement a method for using an out-of-band password to provide enhanced SSO functionality, the method comprising:

the processor receiving notice of a user's access request from an Identity Provider (IDP) of a Federated Single Sign-On (F-SSO) federation, where the access request requests access to a service provided by a Service Provider (SP) of the federation, and where the federation does not support Single Sign-On functionality for that service;

the processor, in response to receiving the notice, identifying and validating the user;

the processor sending a temporary password to the user through an out-of-band communications method, where the user is required to perform an additional authentication procedure when re-entering the temporary password;

the processor updating an information repository with a value of the temporary password;

the processor detecting that the user has entered a correct value of the temporary password;

the processor generating a single-use password; and the processor communicating the single-use password to the user, such that the user may use the single-use password to access the service, and where the in-band communication is a secure communication that is communicated through a medium under control of the Service Provider to a device under control of the Service Provider.

17. The computer program product of claim 16, where the temporary password is subject to constraints selected from the group consisting of:

limiting the temporary password to a certain number of uses;

limiting the temporary password to use during a single session of the secured service;

limiting the temporary password to use during a specified period of time; and limiting the temporary password to use during a specified duration of time after the first use of the temporary password.

18. The computer program product of claim 16, where the out-of-band communications method is selected from the group consisting of:

transmitting the password to a smartphone or mobile device by means of a Short Messaging Service (SMS) text message, where the smartphone or mobile device is distinct from the computer system;

transmitting to a smartphone or mobile device a Web page that identifies the password, where the smartphone or mobile device is distinct from the computer system;

transmitting to a smartphone or mobile device, by means of a Short Messaging Service (SMS), a text message that identifies a URL of a Web page that identifies the password, where the smartphone or mobile device is distinct from the computer system; and reading the password, by means of a synthesized voice, to the user during a phone call initiated by the user.

19. The computer program product of claim 16, where the identifying and validating the user comprises:

the processor, in response to the receiving notice, requesting that the IDP identify and authenticate the user;

the processor redirecting the user to a portal under control of the IDP;

the processor receiving authentication data from the IDP, and the processor redirecting the user to a portal under control of the SP.

20. The computer program product of claim 16, further comprising:

the processor storing a copy of the temporary password in an enterprise directory under control of the SP;

the processor, upon receiving from the user the response to the sending, where the response is a password entered by the user, attempting to match the entered password with the password stored in the enterprise directory; and the processor, deeming the user to have been identified and authenticated as a result of having successfully matched the entered password to the stored password.

* * * * *